(12) United States Patent
Kim et al.

(10) Patent No.: US 9,674,417 B2
(45) Date of Patent: Jun. 6, 2017

(54) MOBILE TERMINAL

(71) Applicant: LG Electronics Inc., Seoul (KR)

(72) Inventors: Jongpil Kim, Seoul (KR); Hakhae Kim, Seoul (KR); Dongjin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/822,331

(22) Filed: Aug. 10, 2015

(65) Prior Publication Data

US 2016/0044232 A1 Feb. 11, 2016

(30) Foreign Application Priority Data

Aug. 11, 2014 (KR) .................. 10-2014-0103850

(51) Int. Cl.
H04N 5/225 (2006.01)
G02B 13/00 (2006.01)
H04N 5/232 (2006.01)
G02B 7/10 (2006.01)
G02B 27/64 (2006.01)
G02B 5/00 (2006.01)

(52) U.S. Cl.
CPC .......... *H04N 5/2257* (2013.01); *G02B 7/102* (2013.01); *G02B 13/009* (2013.01); *G02B 27/64* (2013.01); *H04N 5/2253* (2013.01); *H04N 5/23287* (2013.01); *G02B 5/005* (2013.01)

(58) Field of Classification Search
CPC ............ H04N 5/23212; H04N 5/2253; H04N 5/23287; H04N 5/23296; H04N 5/2257; H04N 5/23248; G02B 27/64; G02B 7/102; G02B 13/009; G02B 5/005
See application file for complete search history.

(56) References Cited

U.S. PATENT DOCUMENTS 6,710,950 B2 * 3/2004 Rouvinen .............. G02B 7/022
310/332
2008/0025711 A1 1/2008 Chi
2008/0186397 A1 8/2008 Kim
2013/0343737 A1 12/2013 Ryu et al.

FOREIGN PATENT DOCUMENTS

KR 1020070019893 A 2/2007
KR 1020070071873 A 7/2007

* cited by examiner

*Primary Examiner* — Padma Haliyur
(74) *Attorney, Agent, or Firm* — Dentons US LLP

(57) ABSTRACT

A mobile terminal including a camera module includes a case; a camera module housing, wherein at least a portion of the housing is exposed through an opening in the case; a first lens unit disposed in the housing and having a plurality of lenses configured to focus light received through the exposed portion of the housing; a second lens unit disposed in the housing and configured to magnify an image formed by light passing through the first lens unit as a function of a distance between the first lens unit and the second lens unit; and a moving unit connected to the first lens unit and the second lens unit and configured to move at least one of the first lens unit and the second lens unit in order to adjust the distance between the first lens unit and the second lens unit.

18 Claims, 8 Drawing Sheets

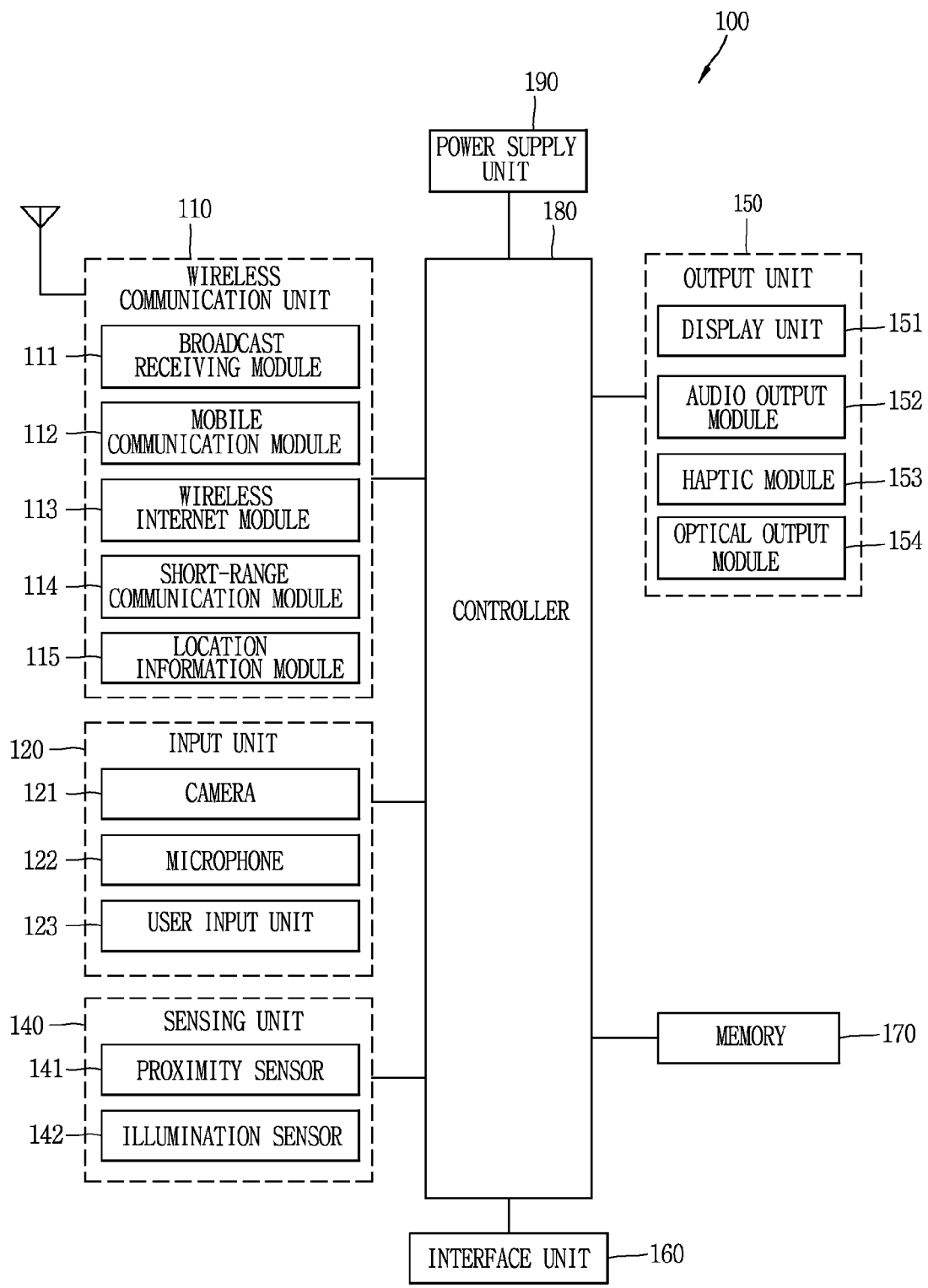

MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0103850, filed on Aug. 11, 2014, the contents of which is incorporated by reference herein in its entirety.

BACKGROUND OF THE INVENTION

1. Field of the Invention

The present disclosure relates to a mobile terminal having a camera module.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Also, capturing images using mobile terminals has increased, and thus, research into a mobile terminal structure allowing for an optical zoom function, while having a compact structure, has been conducted.

SUMMARY OF THE INVENTION

Therefore, an aspect of the detailed description is to provide a mobile terminal equipped with a compact camera module implementing auto-focusing, optical zoom, and an iris function, To achieve these and other advantages and in accordance with the purpose of this specification, as embodied and broadly described herein, a mobile terminal may include: a housing installed in a terminal body such that at least a portion thereof is exposed, and divided into a first region and a second region based on a reference plane; a first lens unit disposed in the first region and having a plurality of lenses to adjusts focus of light that comes from a subject; a second lens unit disposed in the second region and configured to magnify or reduce an image formed by light that passes through the first lens unit according to distances to the first lens unit; and a moving unit connected to the sides of the first lens unit and the second lens unit and configured to move at least one of the first lens unit and the second lens unit in order to adjust a distance between the first lens unit and the second lens unit.

According to an example related to the present disclosure, the moving unit may include: a dual shaft formed such that at least a portion thereof is movable, and extendedly formed in the first region and the second region within the housing; a moving element whose thickness is changed according to voltages applied thereto, to move a portion of the dual shaft; and a connection member connecting the movable portion of the dual shaft to the first lens unit and the second lens unit in order to move the first lens unit and the second lens unit according to an actuation of the moving element.

Here, the dual shaft may include: an inner shaft portion below which the moving element is disposed, and having at least portion which is movable up and down by the moving element; and an outer shaft portion provided to surround the inner shaft portion and extending to the first region and second region within the housing.

Here, the inner shaft portion may include: a moving member disposed above the moving element and moving up and down according to a change in the moving element; an internal connection member coupled to the moving member and moving together according to a movement of the moving member; and a first connection member connecting the internal connection member to the first lens unit or the second lens unit such that the first lens unit or the second lens unit is moved according to a change in the moving element.

The outer shaft portion may include: an outer circumferential portion surrounding the inner shaft portion; an opening formed on the outer circumferential portion, allowing the first connection member to pass therethrough, and having a predetermined length allowing the first connection member to be movable therein; an external connection member surrounding a portion of the outer circumferential portion and coupled to the outer circumferential portion; and a second connection member connecting the external connection member to the first lens unit or the second lens unit, wherein the external connection member guides a barrel not to be vibrated when the first lens unit or the second lens unit moves, and moving along the outer circumferential portion.

Here, the dual shaft may be provided in two positions as a first shaft and a second shaft, and the first shaft and the second shaft may be symmetrical based on the first lens unit and the second lens unit.

Here, one side of the first lens unit may be connected to an inner shaft portion of the first shaft and the other side of the first lens unit may be connected to an outer shaft portion of the second shaft, and the first lens unit may be moved up and down within a predetermined range when a moving element of the first shaft is driven, and one side of the second lens unit may be connected to an inner shaft portion of the second shaft and the other side of the second lens unit may be connected to an outer shaft portion of the first shaft, and the second lens unit may be moved up and down within a predetermined range when a moving element of the second shaft is driven.

Here, the housing may be coupled to a printed circuit board (PCB) disposed within a terminal, and include a vibration reducing unit disposed between the second lens unit and the PCB and provided to vibrate the second lens unit in order to compensate for an image according to vibration of the terminal when an image is captured.

Here, the vibration reducing unit may include a frame accommodating the second lens unit and support portions connecting the second lens unit and the frame in a plurality of points.

Here, at least one of the frame and the support portions may be formed of a shape memory alloy (SMA) which expands and contracts in length according to strength of a current applied thereto.

Here, the mobile terminal may further include: a control unit disposed between the first region and the second region and configured to adjust an amount or characteristics of light which has passed through the first lens unit.

Here, the control unit may be an iris (or a diaphragm) configured to adjust an amount of light and adjust an amount of light, which has passed through the first lens unit, made incident to the second lens unit.

Here, the second lens unit may move up and down in order to compensate for an amount of light which has passed through the iris.

Here, the control unit may be configured to adjust characteristics of light, may be any one among an ND filter of a polarizing filter, or may be a film providing any one effect among soft, cross, rainbow, and apodization to light which has passed through the first lens unit.

Here, the housing may have a plurality of planes, a first plane of the housing may correspond to the first lens unit and include a transparent region formed to be transparent and an opaque region surrounding the transparent region, and a rear case may be installed to cover the opaque region and have a hole corresponding to the transparent region.

Here, the transparent region may have a step with respect to the opaque region.

Here, a second plane of the housing may be disposed to face the first plane and coupled to the PCB within the terminal so as to be fixed within the terminal, and a sensor for sensing light which has passed through the first lens unit and the second lens unit and an infrared (IR) cut filter may be disposed between the housing and the PCB.

Here, the housing may include a body frame and a cover frame, the first lens unit and the second lens unit may be disposed within the body frame, and the cover frame may be installed in the body frame to cover the first lens unit and the second lens unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram of a mobile terminal according to an exemplary embodiment of the present disclosure.

DETAILED DESCRIPTION OF THE INVENTION

Figure 2A:
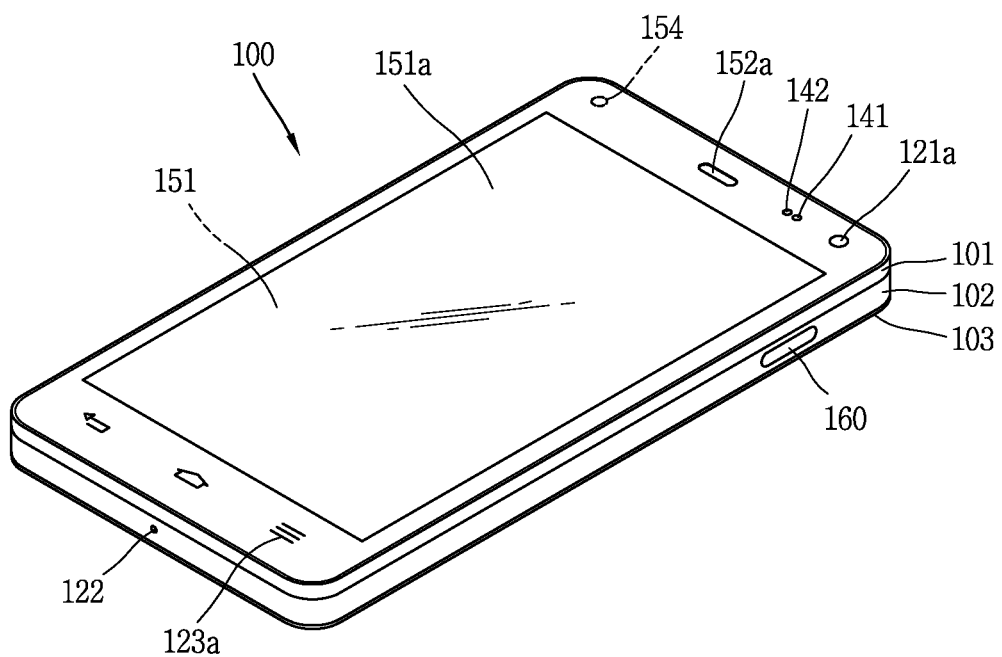
FIGS. 2A and 2B are conceptual views of one example of the mobile terminal, viewed from different directions.
Figure 2B:
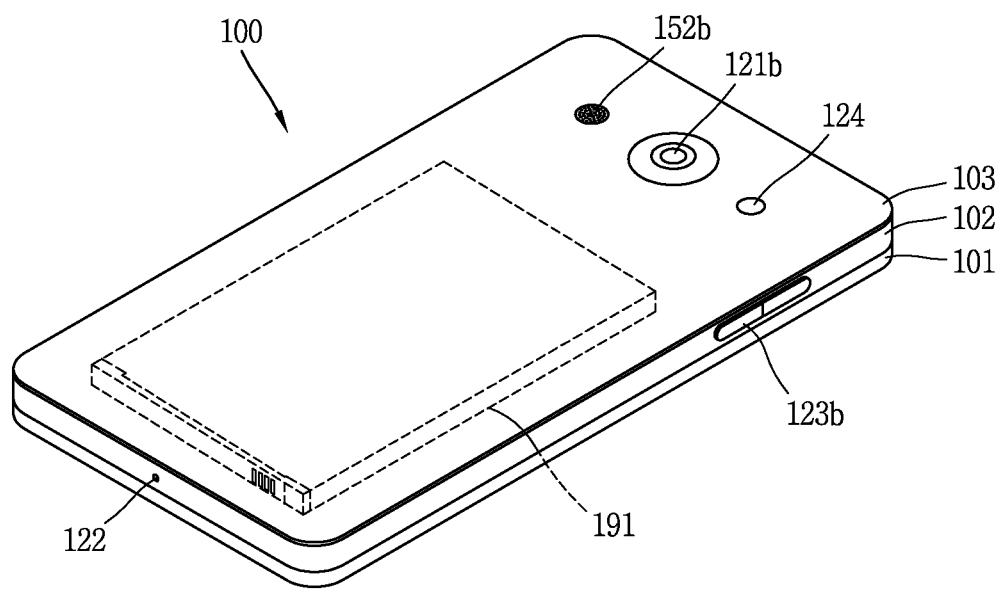

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

As used herein, the singular forms "a", "an" and "the" are intended to include the plural forms as well, unless the context clearly indicates otherwise.

It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

In order to drive an application program stored in the memory 170, the controller 180 may control at least some of the components described above with reference to FIG. 1A. In addition, in order to drive the application program, the controller 180 may combine two or more of the components included in the mobile terminal 100 to operate the same.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may be cooperatively operated to implement operations, control, or control methods of the mobile terminal according to various embodiments described hereinafter. Also, the operations, control, or control methods of the mobile terminal may be implemented in the mobile terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof. The user input unit 123 may recognize information sensed by the sensing unit 140, as well as by the aforementioned mechanical input means and touch type input means, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180.

Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations.

Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal Here, the terminal body may be understood as having a concept designating the mobile terminal 100 as at least one aggregation.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, first and second audio output units 152a and 152b, the proximity sensor 141, an illumination sensor 142, a light output unit 154, first and second cameras 121a and 121b, first and second manipulation units 123a and 123b, a microphone 122, an interface unit 160, and the like.

Hereinafter, as illustrated in FIGS. 1B and 1C, the mobile terminal 100 in which the display unit 151, the first audio output unit 152a, the proximity sensor 141, the illumination sensor 142, the light output unit 154, the first camera 121a, and the first manipulation unit 123a are disposed on a front surface of the terminal body, the second manipulation unit 123b, the microphone 122, and the interface unit 160 are disposed on the side of the terminal body, and the second audio output unit 152b and the second camera 121b are disposed on a rear surface of the terminal body will be described as an example.

However, the components are not limited to the configuration. The components may be excluded, replaced, or disposed on other surfaces as needed. For example, the first manipulation unit 123a may not be provided on the front surface of the terminal body, and the second audio output unit 152b may be provided on the side of the terminal body, rather than on the rear surface of the terminal body.

The display unit 151 may display (or output) information processed in the mobile terminal 100. For example, the display unit 151 may display executed screen information of an application program driven in the mobile terminal 100, or user interface (UI) information or graphic user interface (GUI) information according to the executed screen information.

The display unit 151 may include a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver and the second audio output unit 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. However, the present disclosure is not limited thereto and a position of the rear input unit may be modified.

When the rear input unit is provided on the rear surface of the terminal body, a new user interface may be implemented. Also, when the touch screen or the rear input unit as described above replaces at least some functions of the first manipulation unit 123a provided on the front surface of the terminal body so the first manipulation unit 123a is omitted from the front surface of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, exemplary embodiments of the present disclosure that may be implemented in the mobile terminal configured as described above will be described with reference to the accompanying drawings. It will be obvious to a person skilled in the art that the present disclosure may be embodied to any other specified form within the scope of the spirit and essential characteristics of the present invention.

The present invention relates to a mobile camera module structure including an optical zoom (two lens groups) and a control unit including an IRIS interposed between the two lens groups on the basis of a dual-barrel structure used in a mobile terminal.

Also, the present invention relates to an apparatus for driving a camera module which is able to perform zooming or focusing by using the two groups of lens units, is compact sufficient to be installed in a mobile terminal, and has enhanced assembly characteristics.

A lens driver uses a voice call motor (VCM) scheme, a PZT scheme, and a rotary motor scheme in terms of generating driving force, and in the present disclosure, a lens driver using a PZT scheme will be described.

In the following description, a camera module may be any one of the first camera 121a and the second camera 121b.

Figure 3:
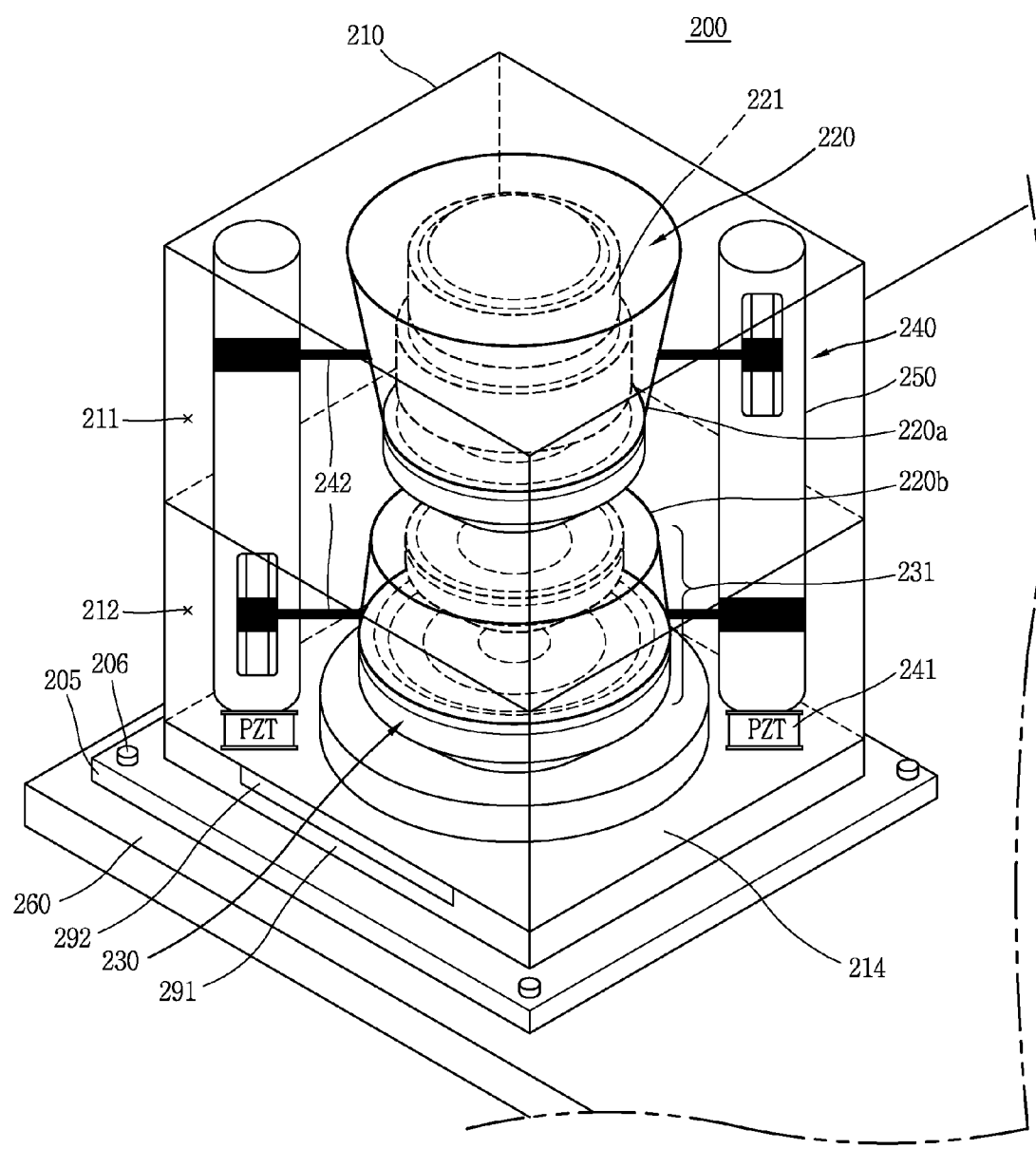
FIG. 3 is a conceptual perspective view illustrating a camera module according to an exemplary embodiment of the present disclosure.

FIG. 3 is a conceptual perspective view of a camera module 200 according to an exemplary embodiment of the present disclosure.

The camera module 200 according to an exemplary embodiment of the present disclosure includes a housing 210, a first lens unit 220, a second lens unit 230, and a moving unit 240.

The housing 210 is installed in an interior of a terminal body such that at least a portion thereof is exposed. The housing 210 is divided into a first region 211 and a second region 212 based on a reference plane within the housing 210. The region 211 refers to an upper portion based on the drawing, and the region 212 refers to a lower portion based on the drawing.

The first lens unit 220 is disposed in the first region 211. The first lens unit 220 includes a plurality of lenses. The plurality of lenses may be formed to adjust focus of light that comes from a subject.

The second lens unit 230 is disposed in the second region 212 and configured to magnify or reduce an image (zoom in or zoom out) formed by light that passes through the first lens unit 220, according to distances to the first lens unit 220.

The moving unit 240 is connected to the sides of the first lens unit 220 and the second lens unit 230, and configured to move at least one of the first lens unit 220 and the second lens unit 230 in order to adjust a distance between the first lens unit 220 and the second lens unit 230.

Based on the reference plane, a region in which the first lens unit 220 moves may be determined in the first region 211, and a region in which the second lens unit 230 moves may be determined in the second region 212.

The moving unit 240 includes a dual shaft 250, a moving element 241, and connection members 242.

The dual shaft 250 may be formed such that at least a portion thereof is movable, and may be extendedly formed in the first region 211 and the second region 212 within the housing 210.

The moving element 241 has a thickness changed according to voltages applied thereto, to move a portion of the dual shaft 250. A moved portion of the dual shaft 250 is a moving member 252 of an inner shaft portion 251. This will be described in detail thereafter.

The connection members 242 may connect the movable portion of the dual shaft 250 to the first lens unit 220 and the second lens unit 230 in order to guide movements of the first lens unit 220 and the second lens unit 230 according to an actuation of the moving element 241.

The first lens unit 220 may have an auto-focusing function and may be disposed to first receive light that comes from a subject, so as to be used as a device for adjusting focus of an incident image.

The second lens unit 230 may have a zoom lens system structure that changes a magnification of an image by moving in an optical axis direction. The second lens unit 230 may execute a lens compensation function by adjusting an amount of light that passes through the first lens unit 220, through movement.

Also, in order to adjust a depth of field and an amount of light, an iris device for a camera may be provided between the first lens unit 220 and the second lens unit 230. This will be described with reference to FIG. 4 hereinafter.

As the first lens unit 220 and the second lens unit 230 move upwardly and downwardly, respectively, a focal length of the second lens unit 230 is varied, and accordingly, an optical zoom function having a magnification of about three times or five times can be implemented.

Also, the first lens unit 220 and the second lens unit 230 may be provided in a case called a barrel. Namely, the first lens unit 220 may be disposed in a first barrel 220a and the second lens unit 230 may be disposed in a second barrel 220b. The first barrel 220a and the second barrel 220b may be connected to portions of the dual shaft 250 by the connection members 242.

Figure 4:
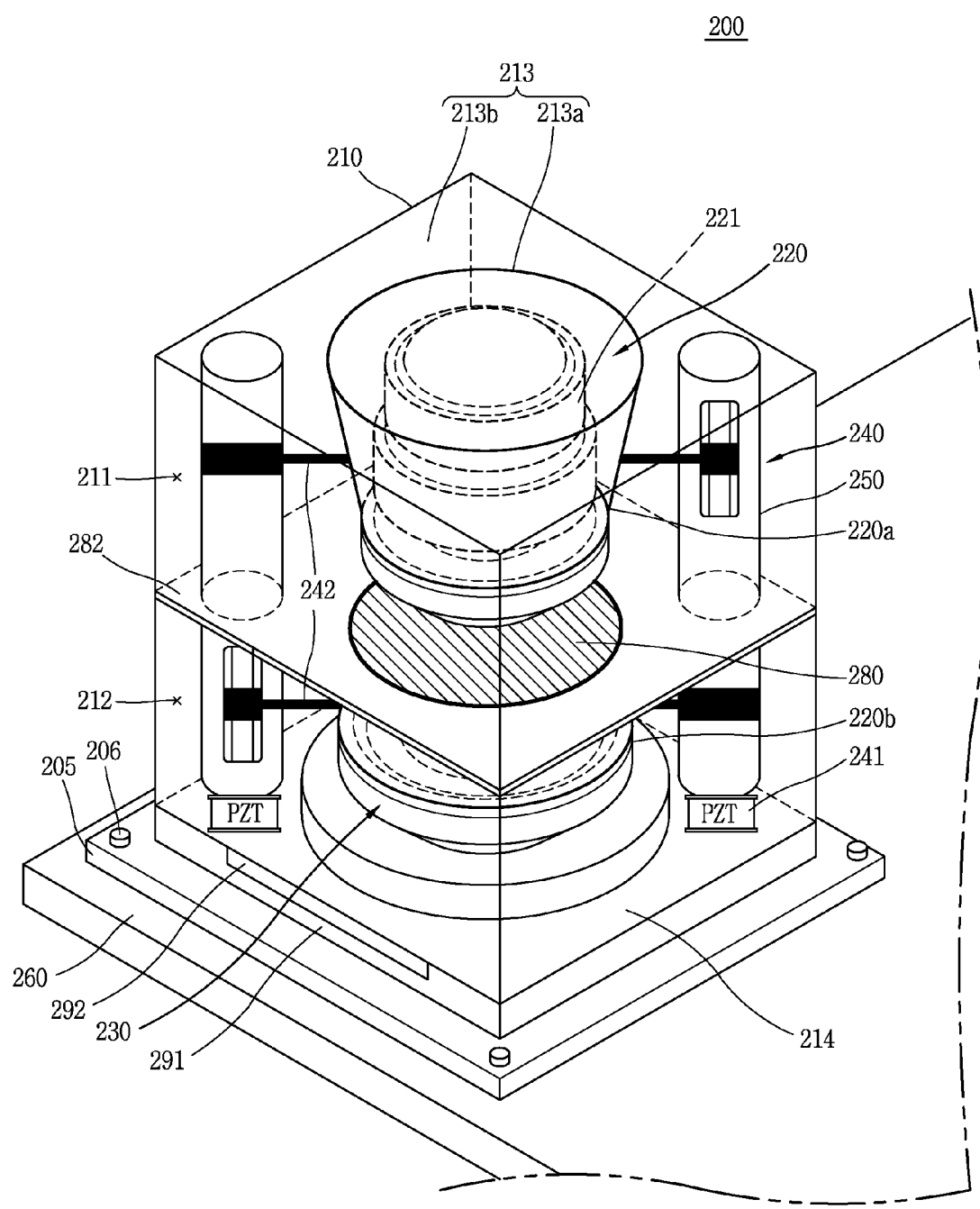
FIG. 4 is a conceptual perspective view illustrating a camera module according to another exemplary embodiment of the present disclosure.

FIG. 4 is a conceptual perspective view illustrating a camera module according to another exemplary embodiment of the present disclosure.

Referring to FIG. 4, the housing 210 may have a plurality of surfaces. In particular, the housing 210 may have a substantially hexahedral shape.

Thereamong, a first plane 213 is a surface facing an outer side of the mobile terminal. The first plane 213 may include a transparent region 213a and an opaque region 213b.

The transparent region 213a is formed to correspond to a region in which the first lens unit 220 may receive light. The transparent region 213a may be formed to be equal to or slightly greater than a diameter of a lens closest to the first plane 213, among a plurality of lenses. Light needs to be transmitted through the transparent region 213a, and thus, the transparent region 213a is preferably formed to be transparent.

The opaque region 213b may surround the transparent region 213a and occupy the other region of the first plane 213. The opaque region 213b may be formed to be opaque to prevent light from being transmitted therethrough. This is because, if light is transmitted through the opaque region 213b, it may interfere with light that enters the first lens unit 220.

Also, the rear case 103 may be installed to cover the opaque region 213b. A hole may be provided to correspond to the transparent region 213a in the rear case 103. Also, the transparent region 213a may protrude from the opaque region 213b to form a step with respect to the opaque region 213b. This will be described in detail hereinafter.

A second plane 214 is disposed to oppose the first plane 213. That is, the second plane 214 faces the interior of the terminal, rather than facing the exterior of the terminal. The second plane 214 may be coupled to a PCB 260 provided in the interior of the terminal and fixed within the terminal.

A detection sensor 291 that senses light which has passed through the first lens unit 220 and the second lens unit 230 and an infrared (IR) cut filter 292 may be disposed between the housing 210 and a printed circuit board (PCB) 260.

Also, the camera module 200 may include a control unit

The control unit 280 is a unit disposed between the first region 211 and the second region 212. The control unit 280 may adjust an amount of light which has passed through the first lens unit 220 or adjust characteristics of light.

A case in which the control unit 280 is configured to adjust an amount of light will be described. The control unit 280 may be an iris whose diameter is controlled to adjust an amount of light, which has passed through the first lens unit 220, which is made incident to the second lens unit 230. The iris may measure an amount of light by a sensor (not shown) that recognizes ambient light, and accordingly, an aperture of the iris may be adjusted to adjust an amount of light that passes through the first lens unit 220.

Also, the second lens unit 230 may be provided to move up and down in order to compensate an amount of light which has passed through the iris. That is, as the second lens unit 230 moves up and down, a depth of field of an image which has passed through the iris may be adjusted or brightness may be adjusted. In the related art in which an iris is provided in the outermost angle of a lens unit of a camera module, it is difficult to compensate for light according to movements of the lens units. In contrast, in the present exemplary embodiment, since the iris is interposed between the first lens unit 220 and the second lens unit 230 which is movable up and down, light which has passed through the iris according to a movement of the lens units can be compensated for.

Also, a case in which the control unit 280 adjusts characteristics of light will be described. Light is allowed to pass through a particular filter such as a neutral density (ND) filter or a polarizing filter, to reduce an amount of light to obtain appropriate exposure or light is polarized.

Alternatively, the control unit 280 may be any one among films capable or providing any one effect among soft, cross, rainbow, or apodization to light which has passed through the first lens unit 220.

In addition, the control unit 280 may include the iris and the film. Also, a plurality of films may be provided. The films may be disposed in a space adjacent to the camera module 200, and may be inserted into or drawn out from the camera module 200 in which the control unit 280 is provided, according to a user selection.

When the iris is added in this manner, a phenomenon in which an excessive amount of light is received to distort a color or make an image spread to turn white in a particular situation.

As for the phenomenon in which an image spreads, for example, when a focused region has a yellow color in capturing an image in the daytime without an iris, a green color may be distorted into a blue color. Also, when a dark portion is focused in outdoor image capturing, exposure is excessively increased to make an image spread to white overall. When a dark object in a black color is focused, exposure is excessively increased to make a color of an object in a bright color spread to white. In this situation, when an iris is disposed between the first lens unit 220 and the second lens unit 230, the phenomenon in which light spreads or a color is distorted may be reduced.

Also, when the iris is disposed between the first lens unit 220 and the second lens unit 230, a degree of freedom may increase. In a camera, the F value is a value obtained by dividing a focal length of a lens by an effective aperture (in other words, F=focal length/effective aperture of lens). The F value may also be called an F number. Here, the effective aperture refers to a diameter of a lens allowing light to be incident thereto, and when the effective aperture is identical, the F value decreases as the focal length increases. Conversely, in a case in which a focal length is identical, the F value decreases as the effective aperture increases. As the F value decreases, an image becomes brighter.

The iris may adjust a diameter thereof when light is incident to the second lens unit 230. In the equation of obtaining the F value, when the effective aperture of the lens and the F value are fixed, a focal length is varied. Thus, images having different focal lengths can be obtained from an identical subject.

Also, the housing 210 may include a mounting board 205 and a mounting member 206 by which the housing 210 is mounted on the PCB 260 disposed within the mobile terminal.

The mounting board 205 may have a plate shape with an area greater than one surface of the housing 210. The housing 210 is coupled to the mounting board 205. The mounting member 206 may be a nail, a screw, and the like, that couples the mounting board to the PCB 260.

Figure 5:
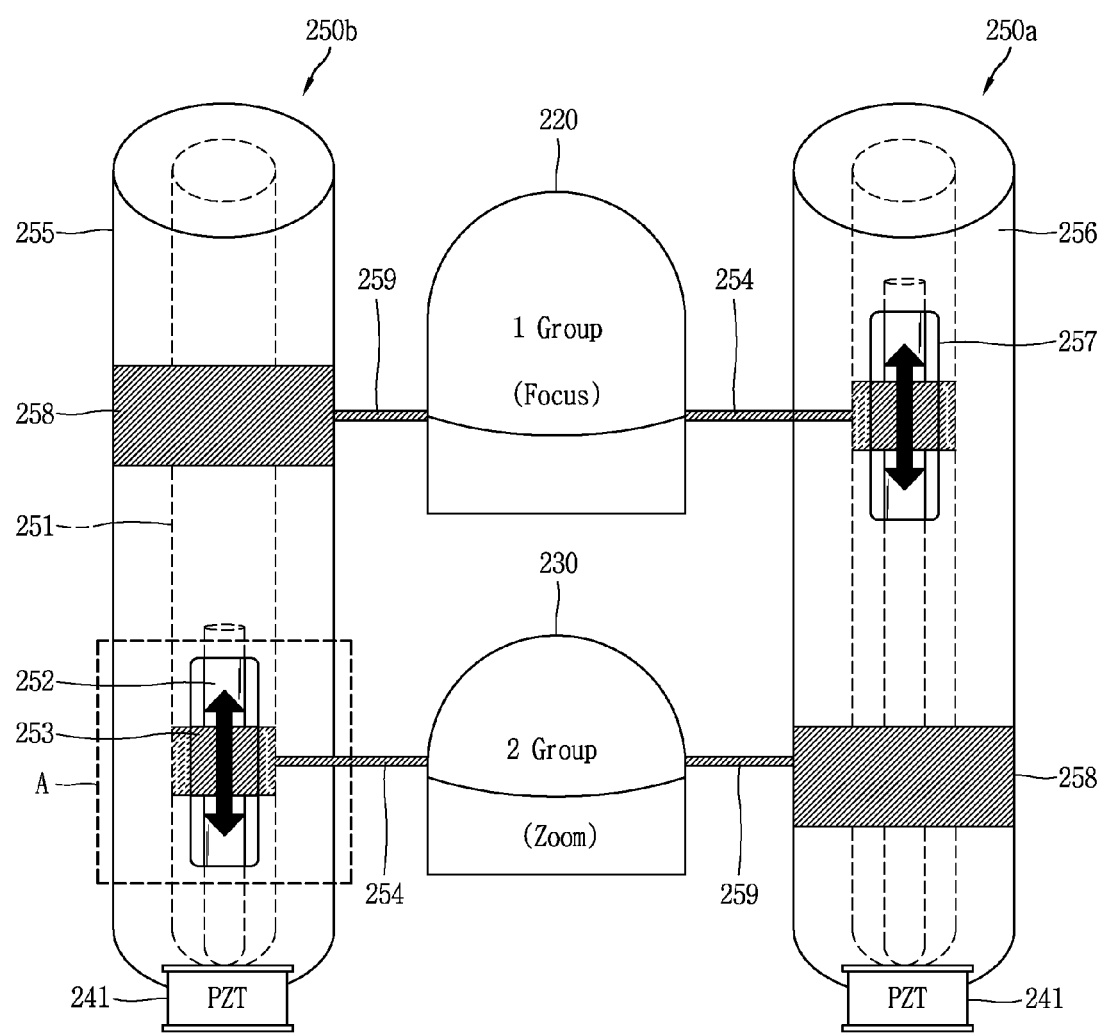
FIG. 5 is a front conceptual view illustrating a moving unit and lens units according to an exemplary embodiment of the present disclosure.

FIG. 5 is a front conceptual view illustrating the moving unit 240 and the lens units according to an exemplary embodiment of the present disclosure.

In the present exemplary embodiment, the moving unit 240 may include the dual shaft 250, the moving element 241, and the connection member. The dual shaft 250 may include an inner shaft portion 251 and an outer shaft portion 255.

The inner shaft portion 251 may include the moving member, a hollow portion, and an internal connection member 253.

The hollow portion is an empty portion in a central portion of the outer shaft portion 255 having a circular form. The hollow portion may communicate with the outer shaft portion 255 by an opening 257. The moving member 252 may be disposed within the hollow portion, and one end portion of the moving member 252 may be in contact with the moving element 241.

The moving member 252 has a bar shape and is disposed within the hollow portion. One end portion of the moving member 252 is in contact with the moving element 241, and when a current is applied to the moving element 241, a size of the moving element 241 is changed and the moving member 252 moves up and down within the hollow portion.

The internal connection member 253 covers the moving member 252 and is coupled to the moving member 252. Thus, when the moving member 252 moves up or down, the internal connection member 253 is movable up and down together. The internal connection member 253 covers the moving member 252 and serves to fill a space between the moving member 252 and the hollow portion. Namely, the internal connection member 253 may be internally in contact with the moving member 252 and externally in contact with the hollow portion such that the moving member 252 may not be shaken horizontally when moved up and down by the moving element 241. In addition, the internal connection member 253 may be formed of a material capable of reducing frictional contact with the hollow portion when the moving member 252 moves up and down.

A first connection member 254 is formed to connect the internal connection member 253 to the first lens unit 220 or the second lens unit 230. Namely, the first connection member 254 connects the moving member 252 and the first lens unit 220 or the second lens unit 230 such that the first lens unit 220 or the second lens unit 230 is moved up and down according to a change in the moving element 241. The first connection member 254 is formed to penetrate through the opening 257. Thus, the opening 257 may be formed to be as wide as a movement distance of the moving member 252 or formed to be wider than the movement distance of the moving member 252.

The outer shaft portion 255 may be formed to surround the inner shaft portion 251, and may be formed to extend to the first region 211 and the second region 212. Also, the outer shaft portion 255 may include an outer circumferential portion 256, the opening 257, an external connection member 258, and a second connection member 259.

The outer circumferential portion 256 may surround the inner shaft portion 251. The outer circumferential portion 256 may have a cylindrical shape with a predetermined thickness.

As mentioned above, the opening 257 may be formed in the outer circumferential portion 256 such that the hollow portion thereof communicates with the exterior. The first connection member 254 passes through the opening 257. Also, since the first connection member 254 moves up and down according to changes in the size of the moving element 241, the opening 257 has a predetermined length.

The external connection member 258 is a member surrounding a portion of the outer circumferential portion 256. The external connection member 258 may be formed to be movable up and down in a state in which the external connection member 258 surrounds the outer circumferential portion 256. This will be described in detail hereinafter.

The second connection member 259 connects the first lens unit 220 or the second lens unit 230 to the external connection member 258.

Hereinafter, driving of the first lens unit 220 and the second lens unit 2330 will be described.

The dual shaft 250 of the moving unit 240 includes a first shaft 250a and a second shaft 250b. The first shaft 250a and the second shaft 250b may be disposed to face each other based on the first lens unit 220 and the second lens unit 230. That is, the first shaft 250a and the second shaft 250b may be provided to be symmetrical based on the first lens unit 220 and the second lens unit 230. With respect to the first lens unit 220, one side of the first lens unit 220 is connected to the first connection member 254 of the first shaft 250a. The first connection member 254 of the first shaft 250a is a member connecting the first lens unit 220 and the internal connection member 253 surrounding the moving member 252 of the first shaft 250a. The internal connection member 253 surrounds the moving member 252, and when the moving member 252 moves up and down, the internal connection member 253 moves up and down together with the moving member 252.

Thus, when a current is applied to the moving element 241 disposed below the inner shaft portion 251 of the first shaft 250a, the moving member 252 of the first shaft 250a moves up and down and the movement of the moving member 252 is transmitted to the first lens unit 220 by the first connection member 254.

Also, the other side of the first lens unit 220 is connected to the second connection member 259 of the second shaft 250b. The second connection member 259 of the second shaft 250b is connected to the external connection member 258 which surrounds the outer circumferential portion 256 of the second shaft 250b and disposed to be movable up and down along the outer circumferential portion 256.

Thus, when the moving element 241 of the first shaft 250a is changed, the moving member 252 of the first shaft 250a moves up and down, the internal connection member 253 of the first shaft 250a moves in the same direction according to the movement of the moving member 252, and the movement of the internal connection member 253 is transmitted to the first lens unit 220 by the first connection member 254. When the first lens unit 220 is moved according to the movement of the first connection member 254, the external connection member 258 of the second shaft 250b moves up and down along the outer circumferential portion 256 of the second shaft 250b and prevents the first lens unit 220 from being shaken during the movement process. Here, the first lens unit 220 and the second lens unit 230 may be formed within a barrel, and the first connection member 254 and the second connection member 259 may move, while guiding the barrel such that the barrel may not be shaken.

The same mechanism as described above may also be applied to the second lens unit 230, and here, the second lens unit 230 is connected to the internal connection member 253 of the second shaft 250b by the first connection member 254 and the other side of the second lens unit 230 is connected to the external connection member 258 of the first shaft 250a by the second connection member 259.

With respect to the first plane 213 of the housing 210, the first lens unit 220 is disposed to be adjacent to the first plane 213, and the second lens unit 230 is disposed below the first lens unit 220. Thus, the opening 257 of the first shaft 250a is formed in the upper side in order to cover the first lens unit 220 disposed in the upper side within the housing 210.

Also, the dual shafts (namely, the first shaft 250a and the second shaft 250b) may include the inner shaft portions 251 formed to be movable within the outer shaft portions 255, respectively. The outer shaft portions 255 and the inner shaft portions 251 may be coaxial.

Figure 6:
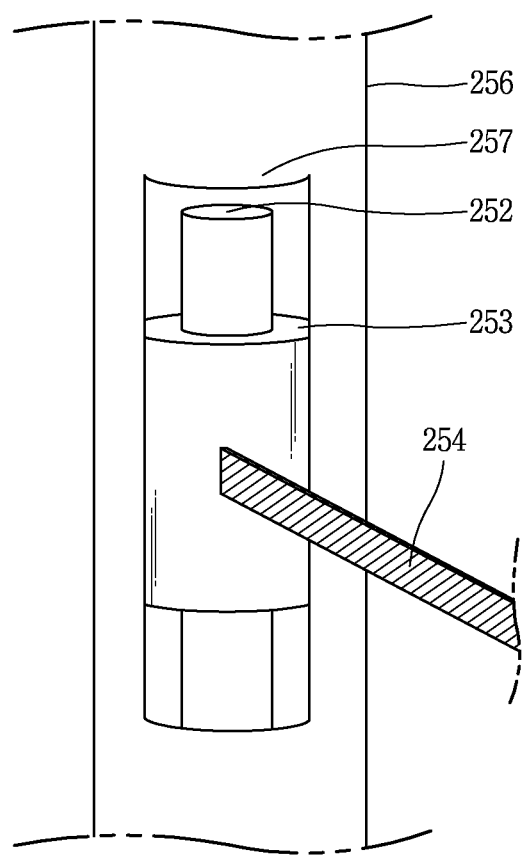
FIG. 6 is a perspective view specifically illustrating a region 'A' of FIG. 5.

FIG. 6 is a perspective view specifically illustrating a region 'A' of FIG. 5. Referring to FIG. 6, the outer shaft portion 255 with the outer circumferential portion 256 formed thereon is illustrated, and the opening 257 is formed in a portion of the outer circumferential portion 256. A hollow portion is formed within the opening 257. The moving member 252 is disposed in the hollow portion and moves up and down according to a movement of the moving element 241 (please refer to FIG. 5). The internal connection member 253, which surrounds the moving member 252 and moves and up and down, is disposed to fill a space between the side walls of the hollow portion. The first connection member 254 is formed to connect the internal connection member 253 to the first lens unit 220 or the second lens unit 230.

A length of the opening 257 may be equal to or longer than a distance over which the moving member 252 is moved by the moving element 241.

Figure 7:
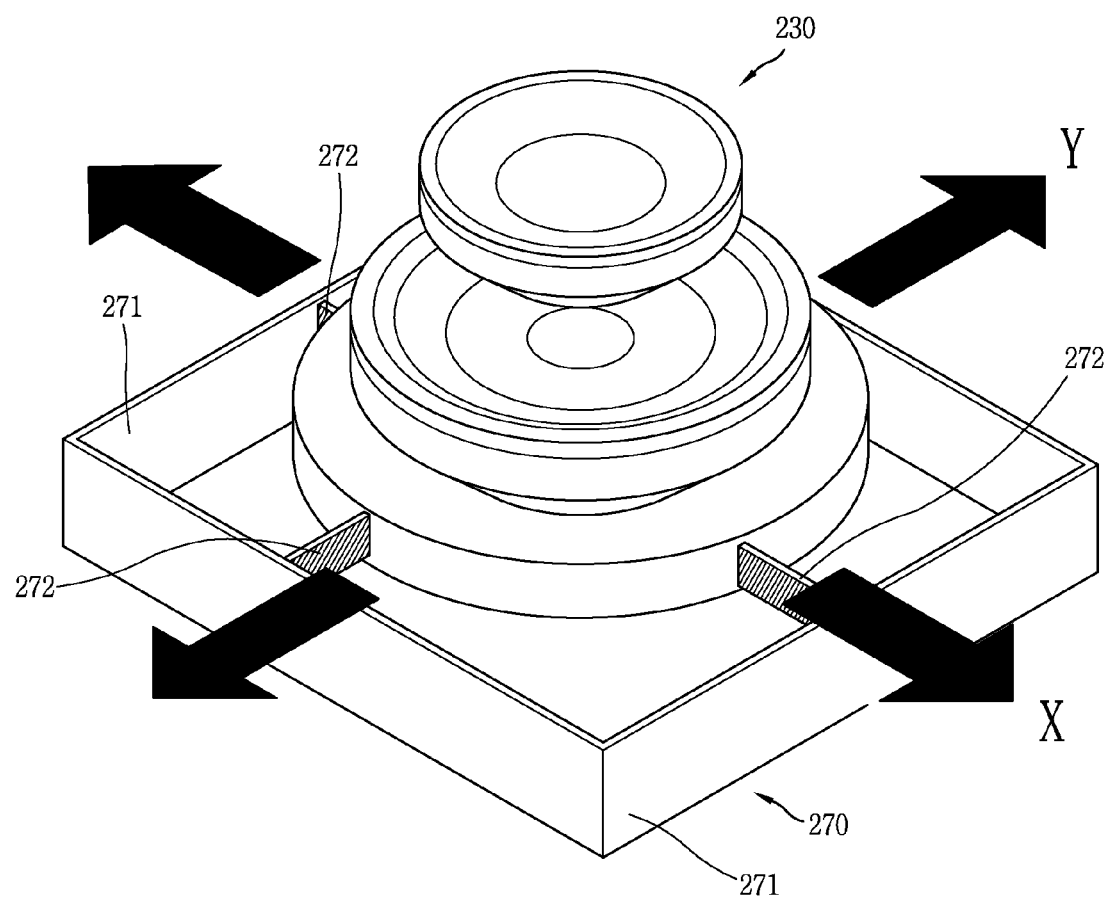
FIG. 7 is a conceptual view illustrating a second lens and a vibration reducing unit according to an exemplary embodiment of the present disclosure.

FIG. 7 is a conceptual view illustrating the second lens 230 and a vibration reducing unit 270 according to an exemplary embodiment of the present disclosure.

Referring to FIGS. 3 and 4, the housing 210 may be coupled to the PCB 260 disposed within a terminal. The vibration reducing unit 270 may be disposed between the second lens unit 230 and the PCB 260.

When the user captures an image with the mobile terminal held in his or her hand, the mobile terminal may vibrate or may be shaken. Here, the vibration reducing unit 270 may be provided to vibrate the second lens unit 230 such that an image may be compensated for according to the vibration of the terminal. Here, the second lens unit 230 may vibrate in a direction opposite to a direction in which the mobile terminal vibrates.

The vibration reducing unit 270 includes a frame 271 and support portions 272.

The frame 271 is provided to accommodate the second lens unit 230. The frame 271 may have a quadrangular shape. The support portions 272 may be provided to connect the second lens unit 230 and the frame 271 in a plurality of points. As illustrated, the support portions 272 may connect the frame 271 and the second lens unit 230 in four points.

The vibration reducing unit 270 vibrates the second lens unit 230 in an X axis and/or a Y axis as illustrated in the drawing. That is, the vibration reducing unit 270 vibrates the second lens unit 230 through 2-axis vibration.

At least one of the frame 271 and the support portions 272 may be formed of a shape memory alloy (SMA) which expands and contracts in length according to strength of a current applied to the frame 271 and/or the support portions 272. Thus, vibration of the mobile terminal is sensed by a sensor (not shown) which is disposed within the mobile terminal to sense vibration of the mobile terminal, and upon receiving information from the sensor, a current is applied to the frame 271 and/or the support portions 272 of the vibration reducing unit 270, thereby vibrating the second lens unit 230 to compensate for vibration of the mobile terminal.

The vibration reducing unit 270 is a component for correcting vibration of an image due to user's handshaking when the user captures an image of a subject. Also, the vibration reducing unit 270 may be based on an optical image stabilization (OIS) scheme using SMA. The second lens unit 230 may be coupled to an SMA actuator driving system and vibrated in two axis perpendicular to a direction in which light is introduced.

Figure 8:
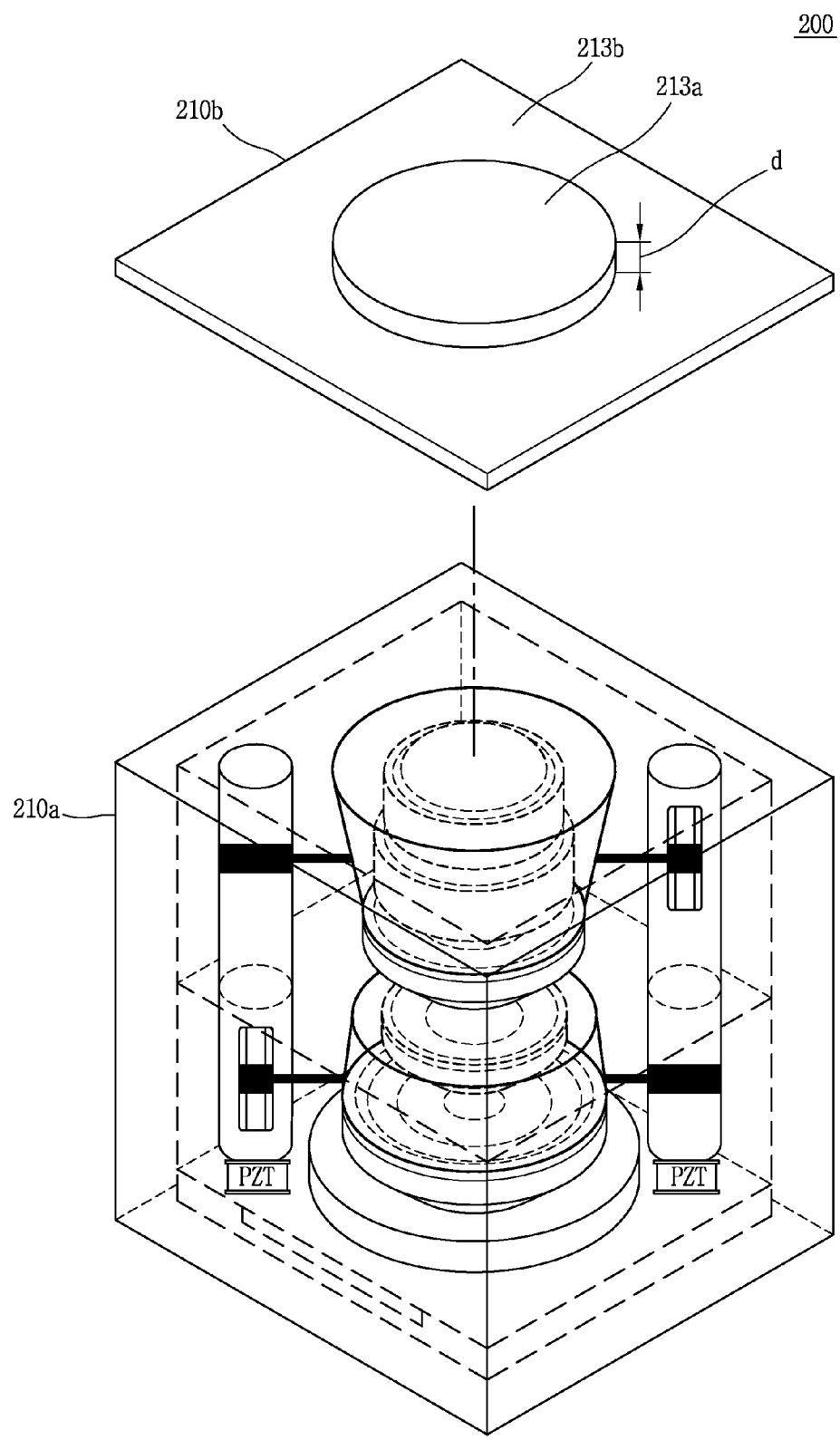
FIG. 8 is a conceptual view illustrating a camera module according to another exemplary embodiment of the present disclosure.

FIG. 8 is a conceptual view illustrating a camera module 200 according to another exemplary embodiment of the present disclosure.

The housing 210 may include a body frame 210*a* and a cover frame 210*b*.

The body frame 210*a* may have a hexahedral shape in which one side thereof is open. The camera module 200 according to the exemplary embodiment described above may be disposed within the body frame 210*a*.

The cover frame 210*b* may be provided to cover the opened side of the body frame 210*a*. That is, in a case in which the cover frame 210*b* covers the body frame 210*a*, the cover frame 210*b* may be installed in the body frame to cover the first lens unit 220 and the second lens unit 230.

The cover frame 210*b* may include a transparent region 213*a* and an opaque region 213*b*.

The transparent region 213*a* may be a region corresponding to the first lens unit 220, and may be a region through which light is introduced from a subject. The opaque region 213*b* may be a region surrounding the transparent region 213*a*.

The cover frame 210*b* may be disposed toward the exterior of the mobile terminal, and the transparent region 213*a* may protrude outwardly with respect to the opaque region 213*b*.

A step formed by the transparent region 213*a* and the opaque region 213*b* may be similar to a thickness of the rear case 103 such that when the rear case 103 covers the opaque region 213*b*, an outer surface of the rear case 103 and an outer surface of the transparent region 213*a* are coplanar.

According to at least one of the exemplary embodiments of the present disclosure, optical zooming may be provided by increasing or decreasing a distance between the first lens unit and the second lens unit of the camera module.

Also, according to at least one of the exemplary embodiments of the present disclosure, since the first lens unit having an auto-focusing function, the second unit having an optical zoom function, and the iris disposed between the first lens unit and the second lens unit are provided as one body, image can be more precisely captured.

Also, according to at least one of the exemplary embodiments of the present disclosure, since the moving element on the basis of a piezoelectric driving scheme is used, the structure is simple and lightweight, and thus, the size and thickness of the camera module can be reduced.

Also, according to at least one of the exemplary embodiments of the present disclosure, since an amount of light and a depth of field of focus can be adjusted by changing an aperture of the iris, obtaining a high quality image.

Also, according to at least one of the exemplary embodiments of the present disclosure, a mobile terminal in which a camera module which is light in weight and compact due to the moving unit having two axes is installed can be implemented.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal comprising:
a terminal body including a front case and a rear case; and
a camera module disposed in the terminal body, the camera module having a housing, a first lens unit, a second lens unit and a moving unit connected to the first lens unit and the second lens unit,
wherein at least a portion of the housing is exposed through an opening in the terminal body,
wherein the first lens unit is disposed in the housing and has a plurality of lenses that focus light received through the exposed portion of the housing;
wherein the second lens unit is disposed in the housing and magnifies an image formed by light passing through the first lens unit as a function of a distance between the first lens unit and the second lens unit; and
wherein the moving unit comprises:
a first shaft;
a moving element in communication with the first shaft, the moving element extends and retracts the first shaft within the housing as a function of an amount of voltage applied to the moving element;
a connection member connecting the first shaft to one of the first lens unit and the second lens unit in order to adjust the distance between the first lens unit and the second lens unit when the first shaft extends or retracts;
a second shaft;
a second moving element in communication with the second shaft, the second moving element that extends and retracts the second shaft within the housing as a function of an amount of voltage applied to the second moving element; and
a second connection member connecting the second shaft to the other one of the first lens unit and the second lens unit in order to adjust the distance between the first lens unit and the second lens unit when the second shaft extends or retracts,
wherein the first and second shafts are dual shafts, and wherein each dual shaft comprises:
an outer shaft portion; and
an inner shaft portion disposed within the outer shaft portion and in communication with the corresponding moving element, wherein at least a portion of the inner shaft extends or retracts within the outer shaft portion as a function of the voltage applied to the corresponding moving element.

2. The mobile terminal of claim 1, wherein the inner shaft portion of the first shaft and the inner shaft portion of the second shaft each comprise:
a moving member in communication with the corresponding moving element, wherein the moving member extends or retracts as a function of the amount of voltage applied to the corresponding moving element;
an internal connection member coupled to and moving with the moving member; and
a first lens unit connection member connecting the internal connection member to one of the first lens unit and the second lens unit, such that the first lens unit moves when the moving member of the first shaft extends or retracts and the second lens unit moves when the moving member of the second shaft extends or retracts.

3. The mobile terminal of claim 2, wherein the outer shaft portion of the first shaft and the outer shaft portion of the second shaft each comprise:
an outer circumferential portion;
an opening formed through the outer circumferential portion, wherein the corresponding first lens unit connection member passes through the opening to connect the corresponding internal connection member with one of the first lens unit and the second lens unit, and wherein the corresponding first lens unit connection member moves within the opening when the corresponding moving member extends or retracts;
an external connection member surrounding a portion of and coupled to the outer circumferential portion; and
a second lens unit connection member connecting the external connection member to the other one of the first lens unit and the second lens unit, wherein the external connection member moves along the outer circumferential portion and guides the other one of the first lens unit and the second lens unit when moved.

4. The mobile terminal of claim 3, wherein the first shaft and the second shaft are symmetrically positioned within the housing relative to the first lens unit and the second lens unit.

5. The mobile terminal of claim 4, wherein the first lens unit connection member of the first shaft is connected to the first lens unit on a first side and the second lens unit connection member of the second shaft is connected to the first lens unit on a second side, and
wherein the first lens unit connection member of the second shaft is connected to the second lens unit on the second side and the second lens unit connection member of the first shaft is connected to the second lens unit on the first side.

6. The mobile terminal of claim 1 further comprising:
a printed circuit board (PCB) disposed within the terminal body; and
a vibration reducing unit disposed between the second lens unit and the PCB, the vibration reducing unit configured to vibrate the second lens unit in order to stabilize an image by compensating for vibration of the terminal when the image is captured.

7. The mobile terminal of claim 6, wherein the vibration reducing unit comprises:
a frame configured to accommodate the second lens unit; and
a plurality of support portions connecting the second lens unit to a corresponding plurality of points on the frame.

8. The mobile terminal of claim 7, wherein at least one of the frame and the support portions is formed of a shape memory alloy (SMA) which expands and contracts as a function of an amount of current applied thereto.

9. The mobile terminal of claim 1 further comprising:
a control unit disposed between the first lens unit and the second lens unit, the control unit configured to adjust the light passing through the first lens unit.

10. The mobile terminal of claim 9, wherein the control unit is an iris configured to adjust the amount of light passing through the first lens unit.

11. The mobile terminal of claim 10, wherein the moving unit moves the second lens unit in order to compensate for the amount of light passing through the iris.

12. The mobile terminal of claim 9, wherein the control unit is a neutral density (ND) filter, a polarizing filter, or Mall a film providing any one of a soft effect, a cross effect, a rainbow effect, and apodization to the light passing through the first lens unit.

13. The mobile terminal of claim 1, wherein the housing comprises:
a plurality of surfaces, including a transparent surface and an opaque surface surrounding the transparent surface, wherein the exposed portion of the housing at least in part includes the transparent surface, and wherein the terminal body covers at least a portion of the opaque surface.

14. The mobile terminal of claim 13, wherein the transparent surface protrudes through the opening in the terminal body and with respect to the opaque surface.

15. The mobile terminal of claim 13, wherein the plurality of surfaces further include a rear surface opposite the transparent and opaque surfaces and coupled to the PCB.

16. The mobile terminal of claim 15 further comprising:
    a sensor configured to sense light passing through the first lens unit and the second lens unit; and
    an infrared (IR) cut filter, wherein the sensor and the IR cut filter are disposed between the rear surface of the housing and the PCB.

17. The mobile terminal of claim 1, wherein the housing comprises:
    a body frame and a cover frame, wherein the first lens unit and the second lens unit are disposed within the body frame, wherein the cover frame covers the first lens unit and the second lens unit, and wherein the cover frame includes the exposed portion of the housing.

18. A mobile terminal comprising:
    a terminal body including a front case and a rear case;
    a camera module disposed in the terminal body, the camera module having a housing, a first lens unit, a second lens unit and a moving unit connected to the first lens unit and the second lens unit,
    a printed circuit board (PCB) disposed between the front case and the rear case; and
    a vibration reducing unit disposed between the second lens unit and the PCB, the vibration reducing unit that vibrates the second lens unit in order to stabilize an image by compensating for vibration of the terminal when the image is captured,
    wherein the vibration reducing unit comprises:
    a frame that accommodates the second lens unit; and
    a plurality of support portions connecting the second lens unit to a corresponding plurality of points on the frame,
    wherein at least a portion of the housing is exposed through an opening in the terminal body,
    wherein the first lens unit is disposed in the housing and has a plurality of lenses that focus light received through the exposed portion of the housing;
    wherein the second lens unit is disposed in the housing and magnifies an image formed by light passing through the first lens unit as a function of a distance between the first lens unit and the second lens unit; and
    wherein at least one of the frame and the support portions is formed of a shape memory alloy (SMA) which expands and contracts as a function of an amount of current applied thereto.

* * * * *